United States Patent [19]

King, Jr. et al.

[11] Patent Number: 4,682,747
[45] Date of Patent: Jul. 28, 1987

[54] UTILITY INSULATED CROSS-ARM

[76] Inventors: Halm C. King, Jr.; Nancy King, both of Star Rte. 2, Box 43J, Hwy. 90 W., Del Rio, Tex. 78840

[21] Appl. No.: 855,836

[22] Filed: Apr. 24, 1986

[51] Int. Cl.⁴ .............................................. F16L 3/22
[52] U.S. Cl. ................................ 248/68.1; 174/45 R
[58] Field of Search ............... 248/68.1, 49, 65, 67.7, 248/218.4, 219.1, 219.4; 174/168, 173, 2, 40 R, 148, 45 R; 52/697, 40, 721

[56] References Cited

U.S. PATENT DOCUMENTS

| | | | |
|---|---|---|---|
| 1,029,207 | 6/1912 | Megahan | 174/149 R |
| 1,239,142 | 9/1917 | Van Diest | 52/697 |
| 2,056,366 | 10/1936 | Richards et al. | 52/697 |
| 2,453,319 | 11/1948 | Hollyday | 174/173 UX |
| 2,870,311 | 1/1959 | Greenfield | 174/149 R X |
| 3,429,758 | 2/1969 | Young | 174/45 R |
| 3,531,578 | 9/1970 | Dey | 52/697 X |
| 3,574,104 | 4/1971 | Medler | 174/45 R UX |
| 3,603,717 | 9/1971 | Scott | 52/697 X |
| 3,715,460 | 2/1973 | Elliott et al. | 174/45 R X |
| 3,803,345 | 4/1974 | Spaeth | 248/68.1 X |
| 3,813,837 | 6/1974 | McClain | 174/45 R X |

FOREIGN PATENT DOCUMENTS

| | | | |
|---|---|---|---|
| 708528 | 6/1941 | Fed. Rep. of Germany | 174/168 |
| 1540295 | 1/1970 | Fed. Rep. of Germany | 174/45 R |
| 2134471 | 2/1973 | Fed. Rep. of Germany | 174/45 R |
| 919534 | 2/1963 | United Kingdom | 174/45 R |

Primary Examiner—J. Franklin Foss
Attorney, Agent, or Firm—Gunn, Lee & Jackson

[57] ABSTRACT

A cross-arm for supporting electric utility wires. The cross-arm is made of insulative material, the inner structure formed of alternate layers of polyester resins and synthetic fabric. An inner core is composed of polyester resin and particulate matter, or polyurethane foam with a central metal reinforcing bar. The cross-arm is modular in nature, and support members are integral with the unit, facilitating installation.

18 Claims, 4 Drawing Figures

UTILITY INSULATED CROSS-ARM

BACKGROUND OF THE INVENTION

1. Field of the Invention

The present invention relates generally to a modular cross-arm support structure for supporting a plurality of power transmission lines on a support structure, such as a vertical pole. More specifically, the present invention provides a utility insulated cross-arm which can be installed quickly and easily, and which provides a plurality of electrical insulators in a fixed spaced relation to ensure adequate separation between the transmission lines carried on the structure.

2. Description of Related Art

Since the earliest use of power transmission lines, there has been a recognition of the need to support the lines above the ground to provide isolation between the lines and the environment. One of the most common arrangements for supporting transmission lines comprises a plurality of electrical insulators mounted on wooden cross-arms attached to vertical wooden poles. Such structures are generally constructed in a sequential manner with a first work crew mounting the wooden poles in the ground, followed by a second work crew which secures the cross-arms to the poles and mounts the electrical insulators on the cross-arms.

Wooden support structures of the type described above have a number of shortcomings, both with regard to durability and with regard to ease of construction. The wooden poles and cross-arms are subject to deterioration from exposure to the environment and from internal defects in the materials.

SUMMARY OF THE INVENTION

The utility insulated cross-arm overcomes the above-mentioned difficulties by providing a modular power transmission support structure which can be manufactured at a central location, transported as a complete unit to a remote location, and then installed in a very short period of time. The cross-arm structure comprises a generally triangular central portion and two horizontal arms extending laterally from the base of the central triangular portion. In the preferred embodiment, the triangular central portion and the laterally-extending arms are comprised of members having a generally square cross-section. An electrical insulator adapted to carry a power transmission line is mounted on the top of the central triangular portion of the structure and on the upper surface of each of the laterally extending horizontal arms. The insulators are attached in a predetermined, fixed, spaced relation which ensures adequate electrical separation between the transmission lines carried on the insulators.

The structural members of the cross-arms comprise an outer shell formed from a polyester resin material and a plurality of alternating layers of polyester resin material and synthetic fabric contained within the shell. The inner core of each structural member contains a longitudinally extending metal bar or cable surrounded by a mixture of polyester resin and particulate matter.

The utility insulated cross-arm support structure for power transmission lines can be mounted quickly and easily on a vertical pole by a single installer working alone. The cross-arm is extremely resistant to deterioration resulting from exposure to the environment and from damage caused by vandals or wild animals.

DESCRIPTION OF THE PREFERRED EMBODIMENTS

Figures 1, 2:
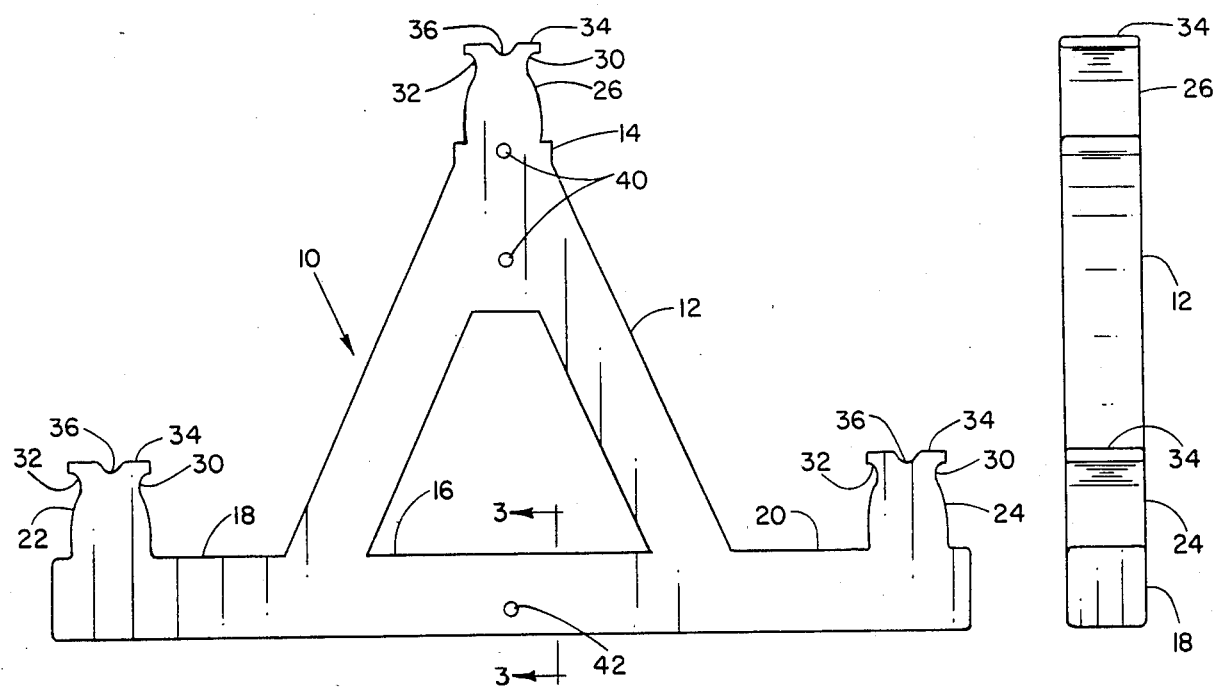
FIG. 1 is an elevational front view of the utility insulated cross-arm support structure of the present invention.
FIG. 2 is an elevational side view of the utility insulated cross-arm support structure of the present invention.

With reference now to the Figures and in particular with reference to FIG. 1, there is depicted a front view of the utility insulated cross-arm 10. Utility insulated cross-arm 10 is generally comprised of a triangular frame 12 having a peak 14 and a base 16, and left and right horizontal cross-arms 18 and 20, respectively. The horizontal cross-arms 18 and 20 are preferably in the same plane as the triangular frame 12 as is shown in FIG. 2. Resting on the upper surface of cross-arms 18 and 20 are lateral supports 22 and 24, located at the distal ends of the cross-arms. An upper support 26, similar to lateral supports 22 and 24, rests on the peak 14 of triangular frame 12. Each of supports 22, 24 and 26 is rectangular in shape, tapering to form longitudinal depressions 30 and 32, and then flaring to form an upper surface 34. The upper surface 34 has a trough 36 therein to provide more stable support for utility lines.

Figure 3:
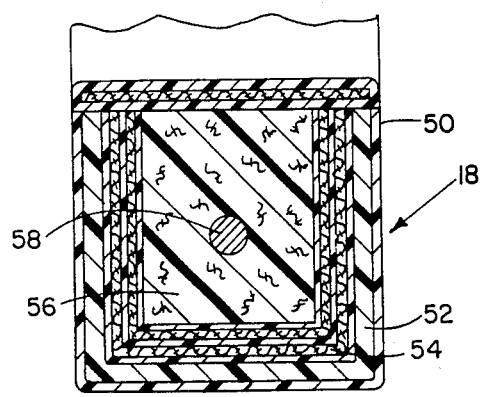
FIG. 3 is a cross-sectional side view taken along section lines 3—3 of FIG. 1 showing details relating to the internal structure of the utility cross-arm.

With reference now to FIG. 3, there is depicted a cross-sectional view of horizontal cross-arm 18. Note that FIG. 3 could also represent cross-sectionals of horizontal cross-arm 20, base 16, or either of the diagonal members of triangular frame 12. The outer shell of cross-arm 18 is composed of a polyester resin material 50. Inside the cross-arm are alternating layers of polyester resin 52 and a synthetic fabric 54. The inner core 56 is formed of a mixture of polyester resin and particulate matter. Inner core 56 may alternately be composed of polyurethane foam. A central metal bar 58 provides extra reinforcement. The bar 58 may alternately be a fiberglass rod or nylon cable.

Figure 4:
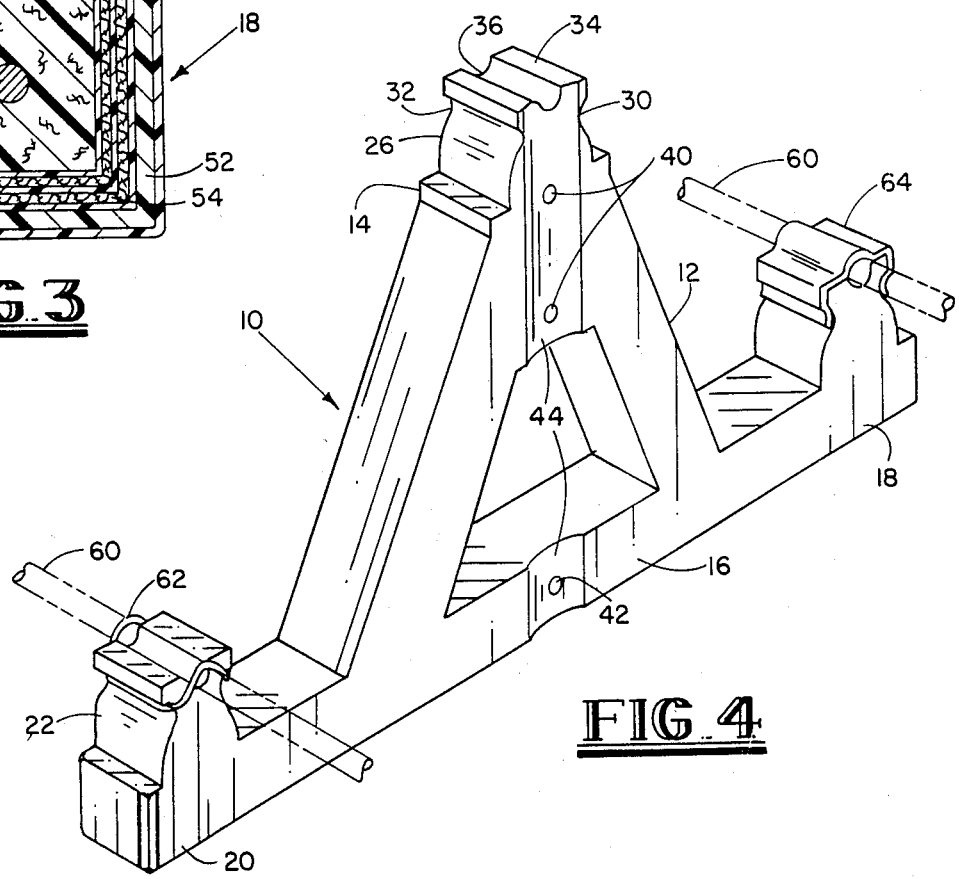
FIG. 4 is a perspective rear view of the utility cross-arm support structure of the present invention.

With further reference to FIG. 4, there is depicted a rear perspective view of the utility insulated cross-arm 10. The device is mounted to a utility pole by means of upper holes 40 and lower hole 42. In the preferred embodiment, bolts are inserted through these holes and then fastened to the utility pole. The rear side of the utility cross-arm 10 has a curved surface 44 along the vertical center line to facilitate attachment of the device to the pole.

Electrical wires 60 rest in the trough 36 and are secured thereto by a strap 62 which overlaps wire 60 and is tautly placed around depressions 30 and 32 of support member 22, 24, or 26. Strap 62 may be replaced by a clamping mechanism 64 which rests upon upper surface 34 and clamps wire 60 to the support member by forcible contact with depressions 30 and 32.

Although the invention has been described with reference to specific embodiments, this description is not meant to be construed in a limiting sense. Various modifications of the disclosed embodiment will become apparent to persons skilled in the art upon reference to the description of the invention. It is therefore contemplated that the appended claims will cover such modifications that fail within the true scope of the invention.

We claim:

1. A utility insulated cross-arm for supporting electrical wires from a utility pole comprising:
   a triangular frame having a base and a peak, said triangular frame being constructed from an insulative material;
   left and right horizontal cross-arms integral with said triangular frame and constructed from an insulative material, located at the base of said triangular frame, said horizontal cross-arms each having an upper surface;
   an upper support member integral with and located at said peak of said triangular frame and constructed from an insulative material;
   attachment means for attaching said electrical wire to said upper support member; and
   mounting means for mounting said triangular frame to said utility pole, said mounting means comprised of a plurality of holes located along a vertical centerline of said triangular frame, for bolting said triangular frame to said utility pole.

2. A utility insulated cross-arm as recited in claim 1 wherein said left and right horizontal cross-arms are coplanar with said triangular frame.

3. A utility insulated cross-arm as recited in claim 2 wherein said left and right horizontal cross-arms have at the distal ends thereof a plurality of lateral support members, located on and integral with said upper surface of said left and right horizontal cross-arms and constructed from an insulative material.

4. A utility insulated cross-arm as recited in claim 1 wherein said triangular frame and said left and right horizontal cross-arms are comprised of:
   an outer shell of polyester resin material;
   a plurality of alternating layers of synthetic fabric and polyester resin material;
   an inner core composed of a mixture of polyester resin and particulate matter; and
   a central longitudinal metal reinforcing bar.

5. A utility insulated cross-arm as recited in claim 1 wherein said triangular frame and said left and right horizontal cross-arms are comprised of:
   an outer shell of polyester resin material;
   a plurality of alternating layers of synthetic fabric and polyester resin material;
   an inner core composed of polyurethane foam; and
   a central longitudinal fiberglass rod.

6. A utility insulated cross-arm as recited in claim 4 wherein said upper support member and said lateral support members are each comprised of and integral with a rectangular insulator having a support surface, said support surface having a trough for accommodating an electrical wire.

7. A utility insulated cross-arm as recited in claim 6 wherein:
   said rectangular insulator has a left side and a right side; and,
   each of said left and right sides of said rectangular insulator has a longitudinal depression parallel to said trough, located near the support surface of said rectangular insulator.

8. A utility insulated cross-arm as recited in claim 7 wherein said attachment means is comprised of a strap overlapping said electrical wire, being tautly held against said longitudinal depressions on each of said left and right sides of said rectangular insulator.

9. A utility insulated cross-arm as recited in claim 7 wherein said attachment means is comprised of a clamp resting upon said wire and said support surface of said rectangular insulator, said clamp having flanges which forcibly abut said longitudinal depressions on each of said left and right sides of said rectangular insulator.

10. A utility insulated cross-arm as recited in claim 1 wherein said triangular frame has a front side and a rear side, said rear side having a curved surface along said vertical center line to facilitate attachment of said triangular frame to said utility pole.

11. A utility insulated cross-arm as recited in claim 4 wherein said triangular frame has a front side and a rear side, said rear side having a curved surface along said vertical center line to facilitate attachment of said triangular frame to said utility pole.

12. A utility insulated cross-arm as recited in claim 6 wherein said triangular frame has a front side and a rear side, said rear side having a curved surface along said vertical center line to facilitate attachment of said triangular frame to said utility pole.

13. A utility insulated cross-arm as recited in claim 7 wherein said triangular frame has a front side and a rear side, said rear side having a curved surface along said vertical center line to facilitate attachment of said triangular frame to said utility pole.

14. A utility insulated cross-arm as recited in claim 8 wherein said triangular frame has a front side and a rear side, said rear side having a curved surface along said vertical center line to facilitate attachment of said triangular frame to said utility pole.

15. A utility insulated cross-arm as recited in claim 9 wherein said triangular frame has a front side and a rear side, said rear side having a curved surface along said vertical center line to facilitate attachment of said triangular frame to said utility pole.

16. A utility insulated cross-arm for supporting electrical wires from a utility pole comprising:
   a rigid bar made of insulative material, having left and right ends, and a central portion;
   two diagonal members integral with said bar, located on either side of said central portion of said bar, said diagonal members joined at a peak, forming a triangle with said bar;
   a plurality of support members, one mounted at and integral with said peak, and others distributed along and integral with said bar, each having a support surface with a trough, for supporting said electrical wires, said support members also having lateral depressions;
   attachment means for securing said electrical wires to said support members by rigidly fastening said attachment means to said electrical wire and said lateral depressions of said support members; and
   a concave surface located at said peak of said diagonal members, and at said central portion of said bar, said concave surface running perpendicular to said bar, said concave surface having apertures therein for mounting said cross-arm to said utility pole.

17. A utility insulated cross-arm as recited in claim 16 wherein said rigid bar is comprised of:
   a central longitudinal metal rod;
   an inner core surrounding said rod, said inner core being a mixture of polyester resin and particulate matter;
   alternating layers of polyester resin and synthetic fabric surrounding said inner core; and
   an outer shell of polyester resin material.

18. A utility insulated cross-arm as recited in claim 16 wherein said rigid bar is comprised of:

a central longitudinal fiberglass rod;

an inner core surrounding said rod, said inner core being composed of polyurethane foam;

alternating layers of polyester resin and synthetic fabric surrounding said inner core; and an outer shell of polyester resin material.

* * * * *